Dec. 13, 1938.   W. C. HUEBNER   2,139,956
METHOD AND MEANS FOR MAKING PHOTOGRAPHIC EXPOSURES
Filed Oct. 29, 1936   4 Sheets-Sheet 1

INVENTOR
William C. Huebner
BY Joseph Harris
ATTORNEY

Dec. 13, 1938.  W. C. HUEBNER  2,139,956
METHOD AND MEANS FOR MAKING PHOTOGRAPHIC EXPOSURES
Filed Oct. 29, 1936  4 Sheets-Sheet 2

INVENTOR
William C. Huebner
By Joseph Harris
ATTORNEY

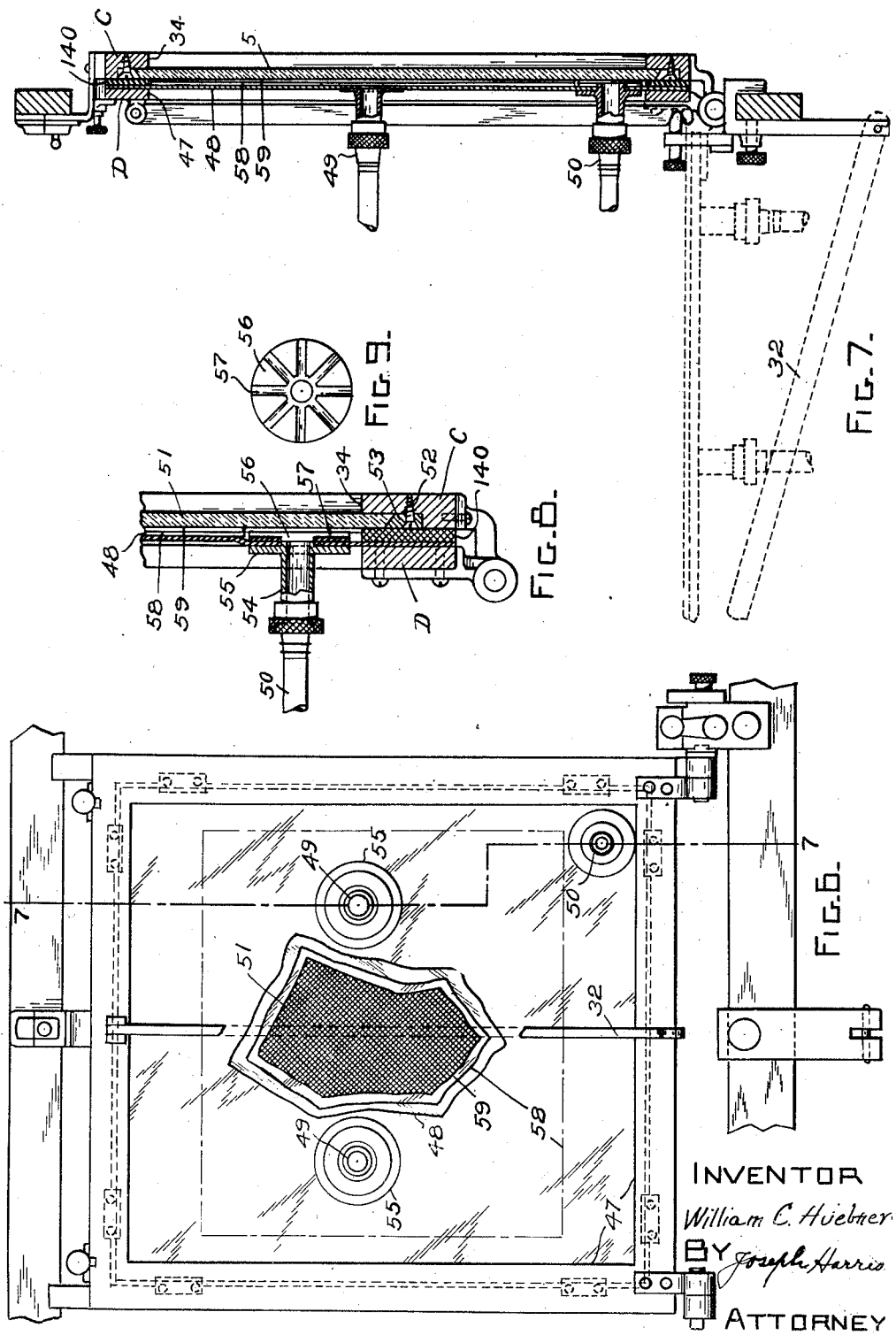

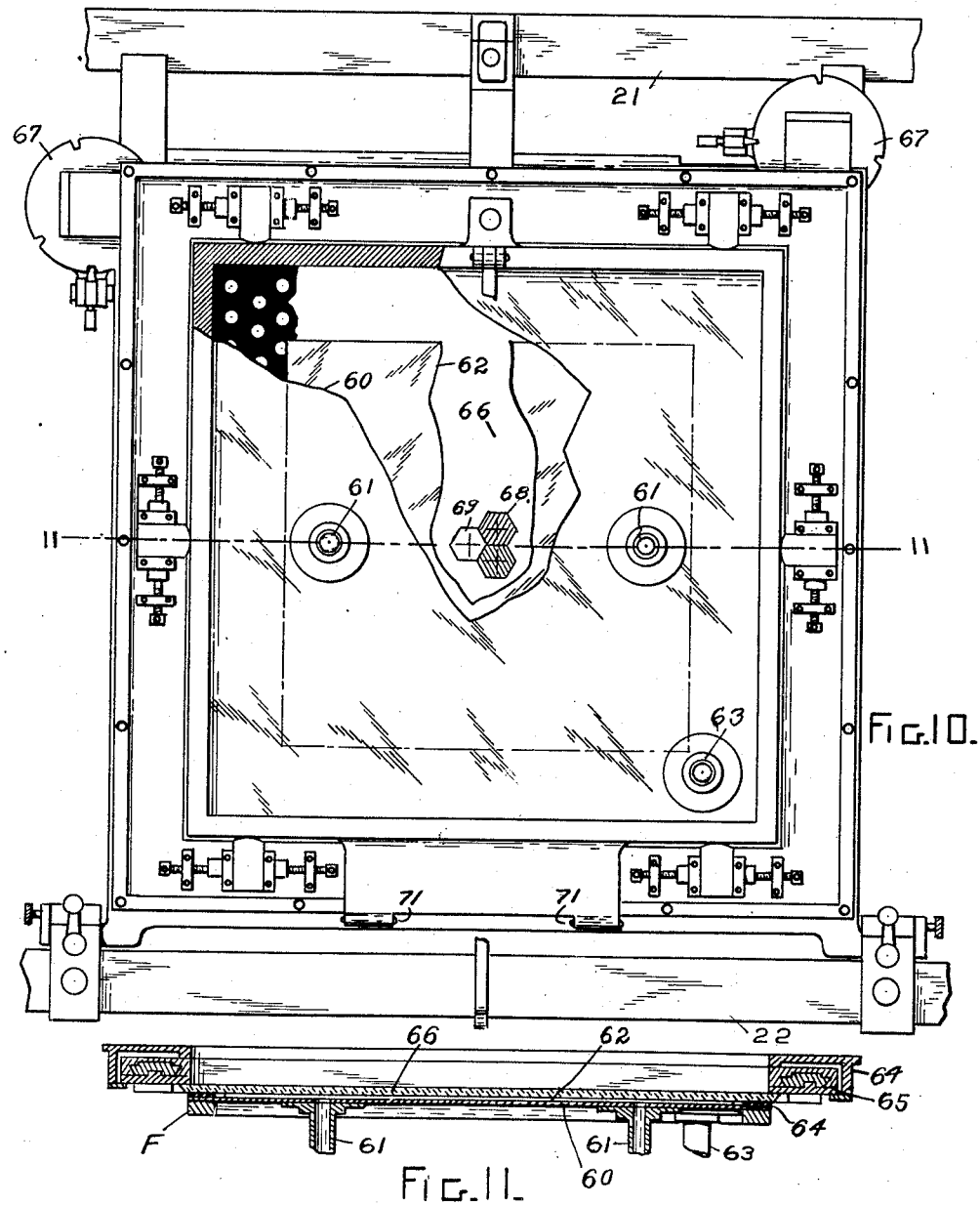

Patented Dec. 13, 1938

2,139,956

UNITED STATES PATENT OFFICE 2,139,956

METHOD AND MEANS FOR MAKING PHOTOGRAPHIC EXPOSURES

William C. Huebner, New York, N. Y.

Application October 29, 1936, Serial No. 108,238

4 Claims. (Cl. 95—36)

This invention relates to improvements in method and means for making photographic exposures.

One object of the invention is to provide an improved method for producing mechanically screened exposures on photographic sensitized surfaces and whereby the lines of the screen are photographically reproduced with maximum sharpness and fidelity together with the image photographed.

Another object of the invention is to provide a method of, simultaneously with the exposure of the image, photographically reproducing the lines of a mechanical screen while the screen and sensitized element are in intimate pressure contact.

A further object of the invention is to provide a method of producing mechanically screened exposures on photographic sensitized surfaces in accordance with the two preceding paragraphs such that either rigid or flexible screens and either rigid or flexible types of sensitized elements may be employed in carrying out the improved method.

Still another object of the invention is to provide a method of producing, on a sensitized surface, a complete photographic image composed of a series of accurately juxtaposed, sharp and clean fractional exposures of predetermined characteristics.

Still another object of the invention is to provide relatively simple means for efficiently carrying out the improvements in the methods hereinbefore set forth and, more specifically, means for placing the screen, whether of rigid or flexible type, and the sensitized element, whether of rigid or flexible type, in intimate pressure contact by vacuum created pressure without danger of injury to the screen or sensitized element.

A further specific object of the invention is to provide improved means for producing a complete photographic image on a sensitized element, which complete image is composed of a series of fractional exposures, said means being characterized by the fact that each fractional exposure is made while the sensitized element and fractional screen are in intimate pressure contact and the shifts between fractional exposures carried out while the pressure between the fractional screen and sensitized element is released.

Other objects of the invention will more clearly appear from the description and claims hereinafter following.

Figure 1:
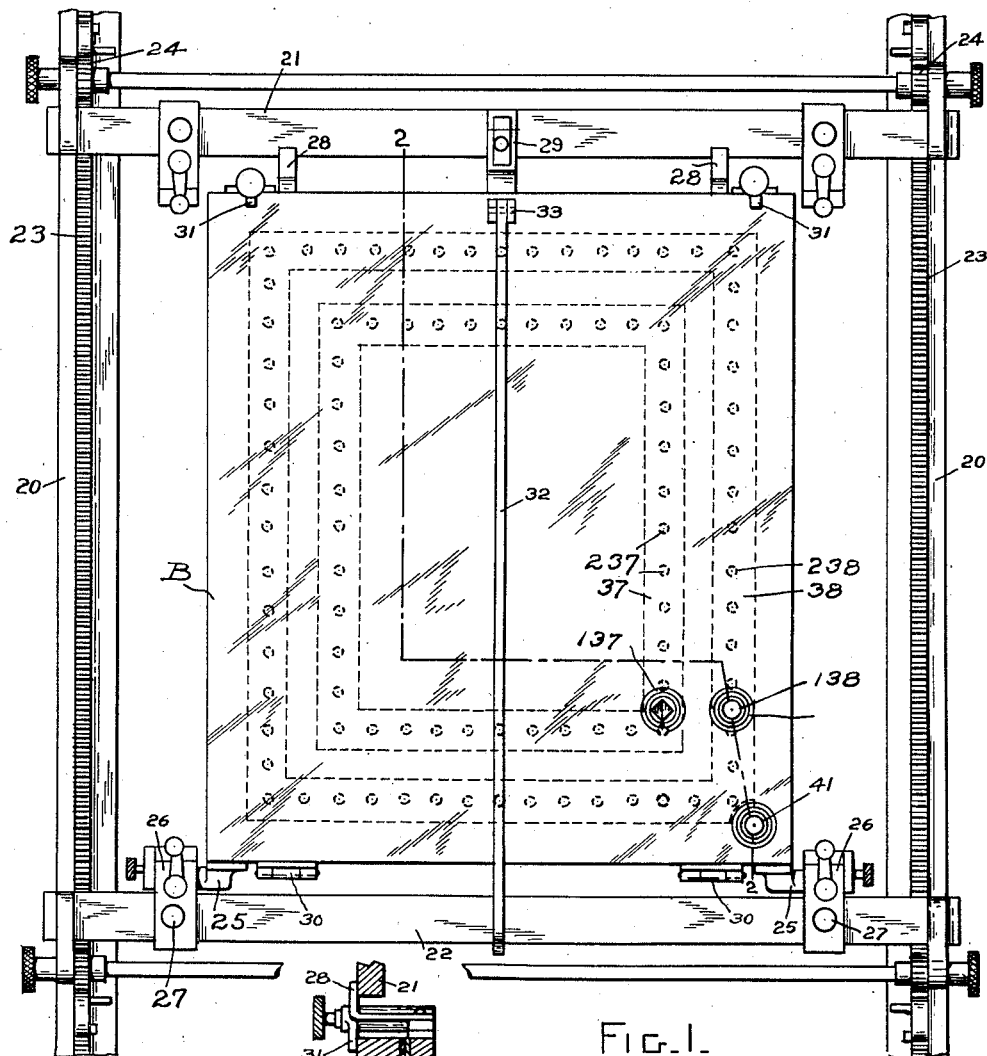
Figure 2:
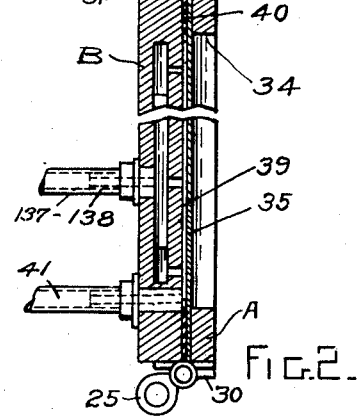
Figure 3:
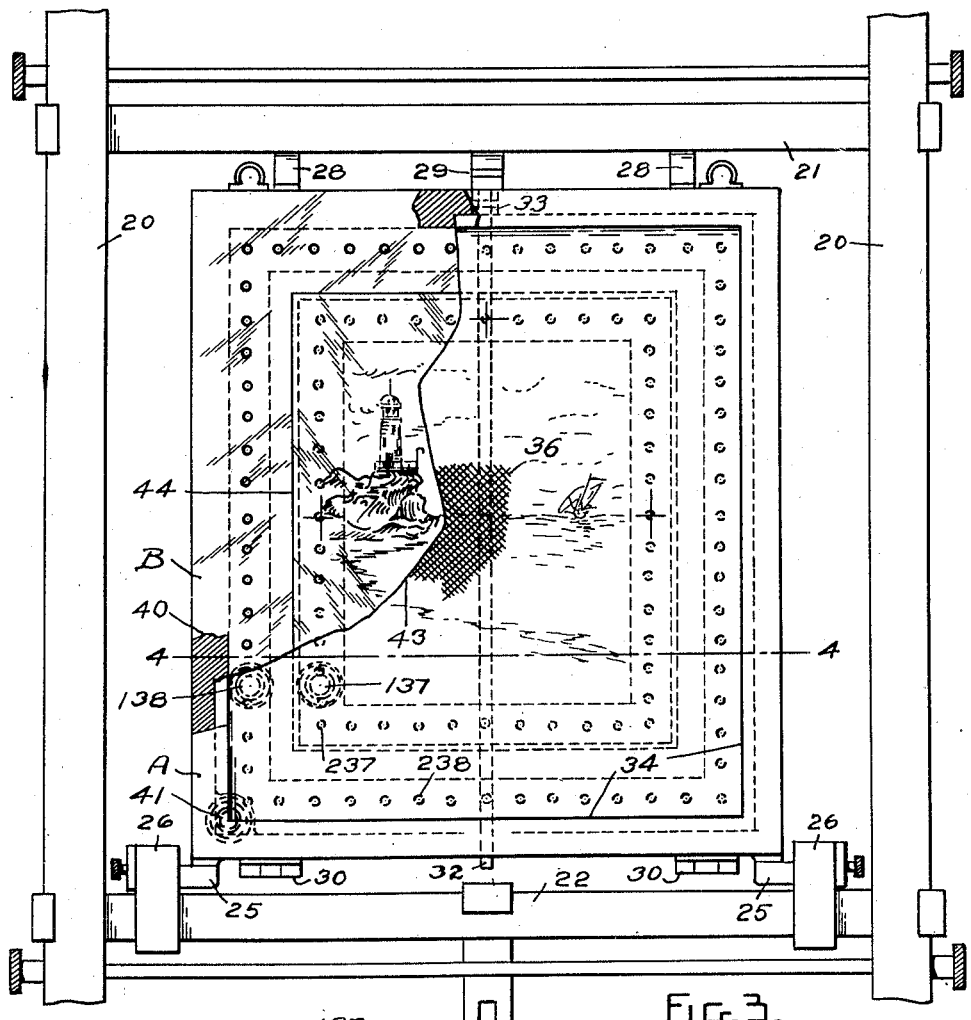
Figure 4:
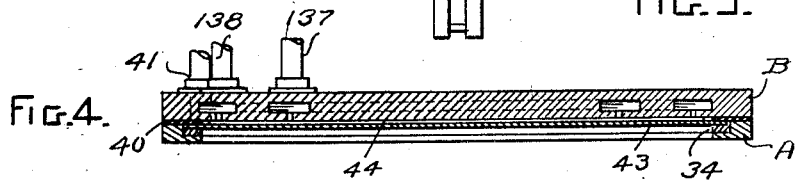
Figure 5:
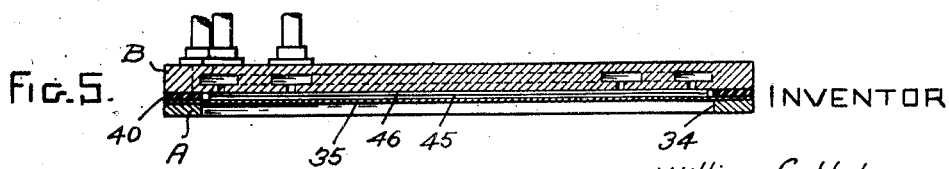

In the drawings forming a part of this specification, Figure 1 is an elevational view of a vacuum screen holder embodying the invention, and by which the improved method of the invention may be carried out, the same being shown as mounted in a camera in focal position for an exposure, the elevation being from the backside of the holder as the same would appear when looking toward the lens of the camera. Figure 2 is an enlarged cross sectional view corresponding substantially to the line 2—2 of Figure 1, part being broken away in order to better accommodate the view on the sheet. Figure 3 is an elevational view of the structure shown in Figure 1, but looking from the opposite side thereof, portions of the rotogravure screen being broken away to better illustrate certain features of the invention. Figure 4 is a horizontal sectional view corresponding substantially to the line 4—4 of Figure 3. Figure 5 is a view similar to Figure 4, illustrating another embodiment of the apparatus features of the invention. Figure 6 is a view similar to Figure 1 illustrating still another embodiment of the apparatus features of the invention and by which the improved method features of the invention may be carried out. Figure 7 is a vertical sectional view corresponding substantially to the line 7—7 of Figure 6, the full lines showing the position of the parts when in operative condition and the dotted lines indicating the open position of the vacuum frame. Figure 8 is a view similar to Figure 7, of a portion of the screen holder upon a somewhat enlarged scale, to better illustrate certain details of construction. Figure 9 is an elevational view of the suction terminal plate shown in Figures 7 and 8. Figure 10 is a view similar to Figure 1, illustrating still another embodiment of the invention, some of the parts being broken out in order to better illustrate certain features of the invention. And Figure 11 is a horizontal sectional view corresponding substantially to the line 11—11 of Figure 10.

Referring first to the construction illustrated in Figures 1 and 2, the improved screen holder is there shown as the same would be mounted and used in a camera of the type disclosed in my co-pending application No. 98,690, filed August 31, 1936, and to which reference may be had for a more detailed disclosure of a complete camera. As shown, the camera is provided with a supporting frame for the sensitized element and screen, which frame includes vertical side bars 20—20, top and bottom jaw bars 21 and 22, the latter being vertically adjustable on the side bars 20 by suitable rack and pinion arrangements 23 and 24, whereby the vertical spacing between said jaw bars may be adjusted for different size holders, as will be understood. As will further be understood, the holding frame for the sensitized element and screen, hereinafter described, will be adjusted to focal position relative to the lens of the camera which lens, as viewed in Figure 1, will be behind the structure there shown, and in front of the structure as illustrated in Figure 3.

The improved sensitized element and screen holder comprises, broadly, a screen holding frame A and a vacuum sealing frame B. The frame A is detachably pivotally mounted on the lower jaw bar 22 by means of hinge pintles 25 supported in brackets 26 which are horizontally slidable and adjustable on the jaw bar 22 and adapted to be held in fixed position as by the set screws 27. The screen frame A is provided at its top with angular clips 28 which engage and act as stops with the upper jaw bar 21 to determine the proper vertical position of the frame A, and the latter is adapted to be retained in said position by any suitable means such as the latch arrangement indicated conventionally at 29.

The vacuum sealing frame B is hingedly connected, along its lower edge, to the screen frame A as by the hinges 30—30 and the frame B is adapted to be retained in operative position locked with the screen frame A by any suitable means such as the pivoted buttons 31—31 carried by the screen frame A at the top thereof. In practice, the vacuum frame B is adapted to be swung down to horizontal open position to facilitate insertion and removal of the sensitized element, as hereinafter described, and to retain the vacuum frame in said work position, said frame may be provided with a strut 32 pivotally connected at its upper end to the frame as indicated at 33 and adapted to latch with a suitable fixed part of the camera holding frame, as illustrated for instance by the dotted lines in Figure 7.

The screen frame A is preferably of rectangular outline with a large center opening 34 and mounted on said frame, on the inside thereof, is the screen 35. In this particular embodiment of the invention being described, the screen 35 is a flexible film on which are provided the engraved or otherwise produced fine lines either transparent or opaque and crossing each other at 90° or other suitable angle as indicated at 36 in Figure 3. Said flexible film screen is secured to the frame A in taut condition but, as will be understood by those skilled in the art, because of its inherent flexibility, will flex slightly when subjected to atmospheric pressure, as hereinafter described.

The vacuum frame B may be of any suitable rigid construction to form a complete back wall extending completely over and beyond the opening 34 of the screen frame A. The frame B will preferably be provided with a plurality of independent air channels 37 and 38 therewithin spaced from each other symmetrically arranged with reference to the center of the frame, and of rectangular outline. Each said air channel 37 or 38 is provided with an exhaust take-off tube as indicated at 137 and 138, each of which is adapted to be connected to a suitable source of suction, such as a suction pump and with suitable valve controls in the lines, as will be understood. Communicating with each channel 37 and 38 is a series of suction holes 237 and 238 opening to the front side or surface of the frame A immediately behind the screen 35. With this construction, as will be apparent, when the air exhaust is applied through the tube 137, for instance, all of the series of holes 237 will be placed under suction and hence exhaust the air from within that area defined by the series of holes 237. Similarly, if the sensitized element indicated at 39 is of such area as to overlie the series of holes 237, but not the series of holes 238, vacuum applied to the holes 237 may be utilized to hold the sensitized element 39 in place against the backing wall of the frame B and vacuum independently applied through the take-off 138 to the outer series of holes 238, will serve to exhaust the air from between the sensitized element 39 and the flexible screen 35.

Additional exhaust take-offs are indicated at 41 and 42 so that a wide latitude is given for exhausting air from different areas and to permit the retention of the sensitized element in fixed position at all times independent of the control of the air exhaust from between the screen and the sensitized element.

To provide an air seal between the two frames A and B when the same are in locked operative position, the frame B may have secured thereto, around its periphery, a rubber or other suitable sealing strip 40.

In the specific construction illustrated in Figures 1 and 2, the sensitized element is preferably of rigid type such as a glass plate with a light sensitive coating thereon or a glass plate with a sensitized film mounted on the plate. With the construction shown, it is apparent that, when the air is exhausted from beneath the screen, the latter will be pressed under atmospheric pressure, into intimate pressure contact with the sensitized element throughout the entire area of the latter. Such pressure contact will obviously be maintained while the object to be photographed has its image light projected through the camera lens onto the sensitized element, thus simultaneously making an exposure of both the image and the screen. By reason of the intimate, vacuum pressure contact between the screen and sensitized element maintained during such simultaneous exposure, sharp and clear reproductions of the lines of the screen will be insured in the composite exposure so made.

Referring next to Figures 3 and 4, the construction there shown is similar to that shown in Figures 1 and 2, except that the screen frame A has mounted therein a glass screen 43 and the sensitized element 44 is a film. With this construction, the same intimate pressure contact is obtainable between the sensitized element and the screen since the sensitized flexible film will readily accommodate itself to the rigid screen without danger of cracking or otherwise injuring either of the elements.

In the Figure 5 construction, the same flexible film type of rotogravure screen 35 is employed as described in connection with Figures 1 and 2. The sensitized element, for instance, is of rigid characteristics, as indicated at 45, but is mounted on a flexible film 46. It is apparent that the same method may be carried out with this combination of screen and sensitized element as previously described in connection with Figures 1 and 2.

Referring next to the construction illustrated in Figures 6 to 9, the general arrangement of the screen frame C and vacuum sealing frame D is the same as that shown and described in connection with Figures 1 and 2, except that the sealing frame D is a rectangular frame with an enlarged central opening 47 corresponding to the opening 34 of the screen frame. The vacuum frame, in this instance, is provided with a flexible, relatively heavy film backing 48 extending over the opening 47 and with which is associated a sealing gasket 140 extending around the periphery of the frame. In this construction, two or more air exhaust outlets are provided, as indicated at 49—49 within the area of the sensitized element to be employed and an additional air outlet 50, preferably near one corner and outside of the area to be occupied by the sensitized element. The screen, in this particular embodiment of the invention, is of the rigid glass type as indicated at 51 and suitably secured to the screen frame C by screws and wedge blocks 52 and 53, as shown. To provide a proper connection between the air exhaust line 50 and the flexible backing 48, the connecting nipple 54 is preferably provided with an enlarged flange 55 engaging the outer surface of the flexible backing 48, the adjacent portions of the film being clamped between said flange 55 and an inner terminal plate 56, the latter preferably having a series of radial grooves 57 to facilitate exhausting of the air from between the flexible backing 48 and the screen 51. The sensitized element, in this construction, is shown as comprising a glass plate 58 on which is mounted a sensitzed film 59.

When the two frames C and D are in locked operative position, air is first exhausted through the outlets 49 from beneath the sensitized element, thus securing the sensitized element fixedly relative to the flexible backing 48. The air is then thereafter exhausted from the space around the sensitized element through the outlet 50, thus drawing the sensitized element and screen into intimate pressure contact which is accommodated by the flexible backing 48 and in which condition the parts are maintained while the exposure is made. As shown in Figure 7, the vacuum frame is adapted to be dropped down to horizontal working position so that the sensitized elements may be inserted or removed and in fact fixedly secured to the backing of the vacuum frame by application of the exhaust through the outlets 49 while the vacuum frame is in the horizontal position and while it is being swung up to operative position.

Referring next to the construction illustrated in Figures 10 and 11, the vacuum sealing frame F is or may be substantially the same as the vacuum sealing frame D described in connection with Figures 6 to 9, that is, the frame will be provided with a flexible backing wall 60 with air exhaust outlets 61—61 for the area immediately beneath the sensitized element 62, which may be either of the flexible film or rigid glass type. A similar additional exhaust 63 is provided for the area around the periphery of the sensitized element. The frame B will also be provided with a sealing gasket 64.

The screen frame in the construction of Figures 10 and 11 is of special type for carrying out fractional exposures with a fractional screen, as disclosed in my prior Patent No. 1,780,191, granted Nov. 4, 1930, to which reference may be had for a more detailed description of the method of making fractional exposures, with each fractional exposure definitely timed for low, medium and high values, as described in said patent.

The screen holder in the construction of Figures 10 and 11 comprises an outer main frame 64 within which is adjustably mounted a sub-frame 65, the latter having mounted thereon the fractional screen 66. Adjustment of the sub-frame 65 in two directions in the plane of the screen is obtained through suitable adjusting means, indicated conventionally at 67—67 which are or may be the same as disclosed in said Patent No. 1,780,191. In Figure 10, three different fractional exposure positions of the screen are indicated diagrammatically at 68, 69 and 70 for low, medium and high values, respectively, it being evident that when three exposures of the same object or copy have been made through the screen positioned in the three different positions indicated, a complete photographic image will be obtained, all as more fully described in said Patent No. 1,780,191.

The screen frame 64—65 is preferably hingedly mounted on the lower jaw bar 22 of the camera and the vacuum sealing frame F in turn hingedly mounted on the screen frame as by the hinged connections 71.

With the means shown in Figures 10 and 11, it is apparent that the sensitized element 62 may be kept permanently in fixed position on the flexible backing 60 by maintaining the vacuum through the exhaust outlets 61—61, it being essential that the sensitized element shall not change its position relative to the lens and object to be photographed. When making the first fractional exposure, assuming the sensitized element held in fixed position under vacuum, vacuum is then applied through the outlet 63 which will draw the sensitized element and screen into intimate pressure contact during which the first fractional exposure may be made. When the first fractional exposure has been made, the vacuum is released through the outlet 63, thus disengaging the screen and sensitized element sufficiently to permit shift of the screen to the next exposure position, whereupon vacuum is again applied between the screen and sensitized element through the outlet 63, these steps being repeated for the third or any subsequent fractional exposure.

As will be apparent from the preceding description, the sensitized element utilized with the present invention, may be of a flexible film, glass, paper or other suitable material, and likewise the screen may be either of rigid or flexible type. In the case of the screen, the lines may be either transparent or opaque and crossing each other at any suitable angle. Dependent upon whether the screen lines are transparent or opaque, the lines representing the screen will be found to be either transparent or without light action in the one case or opaque with full light action, when the sensitized element is developed, all depending upon whether or not the image to be reproduced is required to be negative or positive.

By utilizing the present invention and placing the sensitized element and screen in intimate pressure contact during exposure, the lines reproduced from the screen on the sensitized element, being sharp and clean, may thereafter be utilized in producing the necessary supporting surfaces on copper plates or cylinders for the doctor blade used in rotogravure presses for wiping off the surplus ink from the plate or cylinder, as will be understood by those skilled in the art of rotogravure printing. As will also be obvious, the sensitized elements produced by the method and means hereindescribed, may be used in producing printing plates such as used in either color rotogravure printing and also utilized in color offset printing and typographical printing.

Another advantage of the present invention resides in the fact that the negative or positive films obtained from the simultaneous exposures of the objects and screen with the screen and sensitized element in pressure contact during such exposures, can be exposed directly onto sensitized cylinders or plates in turn having suitable sensitive coatings so that the screen lines, upon exposure to the sensitized surfaces of the plates or cylinders will light harden light portions thereof to protect the plates or cylinders during the deep etching necessary to produce a practical intaglio etched rotogravure cylinder and thus eliminating the separate exposures of the screens and films on the cylinders or plates, as heretofore deemed necessary and hence resulting in a great saving of time and costs. Other advantages will readily suggest themselves to those skilled in the art.

Although there has herein been shown and described what is now considered the preferred manner of carrying out the invention, the same is by way of illustration and not by way of limitation. All changes and modifications are contemplated that come within the scope of the claims appended hereto.

What is claimed is:

1. In a device of the character described, the combination with a holder having a flexible backing wall; of a rigid screen on said holder and air sealed with respect to said flexible backing wall; a sensitized element interposed between said screen and backing wall; means for exhausting air from between said sensitized element and backing wall and additional means for exhausting air from between said backing wall and screen, said two exhausting means being independently controllable and operable.

2. In a device of the character described, the combination with a frame; of a fractional screen mounted on said frame; means on said frame for adjusting said screen to different fractional exposure positions thereon; a vacuum sealing frame adapted to be moved into air sealed contact with said screen; a backing wall mounted on said vacuum sealing frame and forming between it and said screen, when the vacuum sealing frame is in contact with the screen, an air chamber in which is adapted to be positioned a sensitized element; means for exhausting air in the area beneath the sensitized element and between it and said backing wall; and independent means for exhausting air from the space between the screen and the backing wall of said vacuum sealing frame at a different point outside the area of the sensitized element, said two exhausting means being independently controllable and operable.

3. The herein described improvement in the method of making a series of fractional photographic exposures, on a sensitized element, of an image of an object projected through a camera lens which is carried out with a fractional screen and a sensitized element mounted on a flexible backing, including: maintaining the sensitized element in fixed position on said backing throughout the series of fractional exposures; positioning the fractional screen adjacent the sensitized element and forming an air seal therebetween; exhausting the air from between the screen and sensitized element to thereby place the screen and element in intimate pressure surface contact; making a fractional light exposure of the object through the camera lens while the screen and element are in such intimate pressure contact; while maintaining the object fixed with respect to the camera lens and sensitized element, releasing the vacuum between the screen and sensitized element and shifting the screen to a second fractional exposure position; again forming an air seal between the screen and sensitized element and then exhausting the air from between the screen and element to again place the screen and element in intimate pressure surface contact; then making a second similar fractional light exposure of the object through the camera lens while the screen and element are in such intimate pressure contact; and repeating said steps for any additional fractional exposures.

4. In a device of the character described, the combination with a holder including a backing wall element; of a screen element mounted on said holder; means providing an air seal around the periphery of said screen element and said backing wall element when they are placed in face to face contact; a sensitized element interposed between said backing wall element of the holder and the screen element, one of the aforesaid elements being inherently flexible; means for exhausting air from between said sensitized element and said backing wall element; and separate means for exhausting air from said air sealed space between the screen element and said backing wall element, said two air exhausting means being selectively operable and controllable.

WILLIAM C. HUEBNER.